United States Patent

Wheat et al.

[11] Patent Number: 5,997,679
[45] Date of Patent: Dec. 7, 1999

[54] HEAT-SEAL STRENGTH IN POLYOLEFIN FILMS

[75] Inventors: William R. Wheat; Aiko Hanyu, both of Houston, Tex.

[73] Assignee: Fina Technology, Inc., Dallas, Tex.

[21] Appl. No.: 08/953,523

[22] Filed: Oct. 17, 1997

[51] Int. Cl.[6] .................................................. B29C 47/00
[52] U.S. Cl. .............. 156/244.11; 264/134; 264/173.14; 264/173.15; 264/173.19; 264/290.2; 427/393.5; 427/412.3; 428/424.8
[58] Field of Search .......................... 264/173.11, 173.14, 264/173.15, 173.19, 288.4, 290.2, 134; 428/424.8, 515, 516; 156/244.11, 244.12, 244.27; 427/393.5, 412.3

[56] References Cited

U.S. PATENT DOCUMENTS

| 4,298,718 | 11/1981 | Mayr et al. | 526/125 |
|---|---|---|---|
| 4,483,971 | 11/1984 | Sato et al. | 526/142 |
| 4,544,717 | 10/1985 | Mayr et al. | 526/125 |
| 4,594,376 | 6/1986 | Hamada | 524/101 |
| 4,692,380 | 9/1987 | Reid | 428/349 |
| 4,794,096 | 12/1988 | Ewen | 502/117 |
| 4,975,403 | 12/1990 | Ewen | 502/113 |
| 5,340,878 | 8/1994 | Sadatoshi et al. | 525/240 |
| 5,486,561 | 1/1996 | Hirano et al. | 524/451 |
| 5,529,843 | 6/1996 | Dries et al. | 428/336 |
| 5,573,723 | 11/1996 | Peiffer et al. | 264/448 |
| 5,667,902 | 9/1997 | Brew et al. | 428/518 |
| 5,716,570 | 2/1998 | Peiffer et al. | 264/146 |
| 5,773,142 | 6/1998 | Murschall et al. | 428/349 |
| 5,817,412 | 10/1998 | Lohmann et al. | 428/336 |

FOREIGN PATENT DOCUMENTS 2178104  12/1996  Canada.

Primary Examiner—Jan H. Silbaugh
Assistant Examiner—Mark Eashoo
Attorney, Agent, or Firm—Jimmy D. Wheelington; William D. Jackson; M. Norwood Cheairs

[57] ABSTRACT

The present invention is for the improvement of inter-layer bonding strength in polypropylene films through the addition of ethylene as a mini-random copolymer in an amount of no more than about 1 weight percent, more preferably no more than about 0.7 weight percent, and most preferably between about 0.3 weight percent to about 0.5 weight percent or even amounts less than about 0.2 weight percent. The invention allows the improvement of inter-layer bond strength in multi-layer films resulting specifically in improved heat seal strength. The invention encompasses both the resulting films with enhanced heat seal strength and the process for producing such films. In the preferred embodiment, the proposed mini-random copolymer is formed into a film layer used in place of a propylene homopolymer layer, providing improved bonding properties over a film formed of polypropylene homopolymer, while maintaining at acceptable levels the physical and optical characteristics of a film layer made from a propylene homopolymer, such as stiffness.

17 Claims, 2 Drawing Sheets

HEAT-SEAL STRENGTH IN POLYOLEFIN FILMS

FIELD OF THE INVENTION

This invention relates to polyolefin films, and more particularly to the improvement of heat-seal strength through improvement of inter-layer bonding properties of such films.

BACKGROUND OF THE INVENTION

The polymers normally employed in the preparation of biaxially-oriented polypropylene films are isotactic polymers such as isotactic polypropylene, although on some occasions the use of syndiotactic polymers has been proposed. Isotactic polypropylene is one of a number of crystalline polymers which can be characterized in terms of the stereoregularity of the polymer chain. Various stereospecific structural relationships denominated primarily in terms of syndiotacticity and isotacticity may be involved in the formation of stereoregular polymers for various monomers.

Isotactic polypropylene is conventionally used in the production of relatively thin films in which the polypropylene is heated and then extruded through dies and subjected to biaxial orientation by stressing the film in both a longitudinal direction (referred to as the machine direction) and in a transverse or lateral direction sometimes referred to as the "tenter" direction. The structure of isotactic polypropylene is characterized in terms of the methyl group attached to the tertiary carbon atoms of the successive propylene monomer units lying on the same side of the main chain of the polymer. That is, the methyl groups are characterized as being all above or below the polymer chain. Isotactic polypropylene can be illustrated by the following chemical formula:

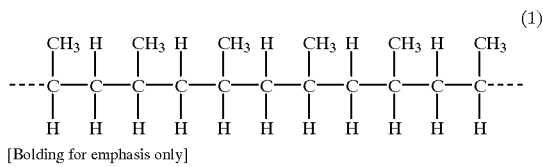

[Bolding for emphasis only]

Another way of describing the structure is through the use of NMR. Bovey's NMR nomenclature for an isotactic pentad is . . . mmmm . . . with each "m" representing a "meso" dyad, or successive methyl groups on the same side of the plane of the polymer chain. As is known in the art, any deviation or inversion in the structure of the chain lowers the degree of isotacticity and crystallinity of the polymer.

The isotactic polymers normally employed in the preparation of biaxially-oriented polypropylene films are usually those prepared through the use of conventional Ziegler-Natta catalysts of the type disclosed, for example, in U.S. Pat. Nos. 4,298,718 and 4,544,717, both to Myer et al. Thus, U.S. Pat. No. 5,573,723 to Peiffer et al discloses a process for producing biaxially-oriented polypropylene film based on an isotactic polypropylene homopolymer or propylene-ethylene copolymers. Other copolymers of propylene and alpha-olefins having from 4–8 carbon atoms also may be employed in the Peiffer process.

Catalysts employed in the polymerization of alpha-olefins may be characterized as supported catalysts or unsupported catalysts, sometimes referred to as homogeneous catalysts. Traditional supported catalysts are the so-called "conventional" Ziegler-Natta catalysts, such as titanium tetrachloride supported on an active magnesium dichloride as disclosed, for example, in the aforementioned patents to Myer et al. A supported catalyst component, as disclosed in the Myer '718 patent, includes titanium tetrachloride supported on an "active" anhydrous magnesium dihalide, such as magnesium dichloride or magnesium dibromide. The supported catalyst component in Myer '718 is employed in conjunction with a co-catalyst such as an alkylaluminum compound, for example, triethylaluminum (TEAL). The Myer '717 patent discloses a similar compound which may also incorporate an electron donor compound which may take the form of various amines, phosphenes, esters, aldehydes, and alcohols. Metallocene catalysts are often employed as unsupported or homogeneous catalysts, although, as described below, they also may be employed in supported catalyst components.

Alternative types of catalysts that produce isotactic polyolefins are disclosed in U.S. Pat. Nos. 4,794,096 and 4,975,403. These patents disclose chiral, stereorigid metallocene catalysts that polymerize olefins to form isotactic polymers and are especially useful in the polymerization of highly isotactic polypropylene.

SUMMARY OF THE INVENTION

The present invention relates to multi-layer polyolefin film. The film includes a core layer formed of an ethylene-propylene copolymer where the ethylene is present in an amount of no more than about 1 weight percent, preferably between about 0.1 weight percent and about 0.7 weight percent, and most preferably between about 0.3 weight percent and about 0.5 weight percent. The film has a surface layer contiguous to and bonded with the core layer, where the core layer has a thickness greater than the thickness of the surface layer. The surface layer is a thermoplastic polymer capable of forming an effective heat seal with a corresponding thermoplastic polymer upon heating to an elevated temperature and compression. The ethylene-propylene copolymer forming the core layer has an isotactic structure and contains ethylene in an amount which is effective to provide an inter-layer bond strength with the surface layer which is at least about 15 percent greater than the inter-layer bond strength between the surface layer and a film formed of isotactic polypropylene homopolymer. The present invention further relates to a method for producing such a multi-layer film.

DETAILED DESCRIPTION OF THE INVENTION

Figure 1:
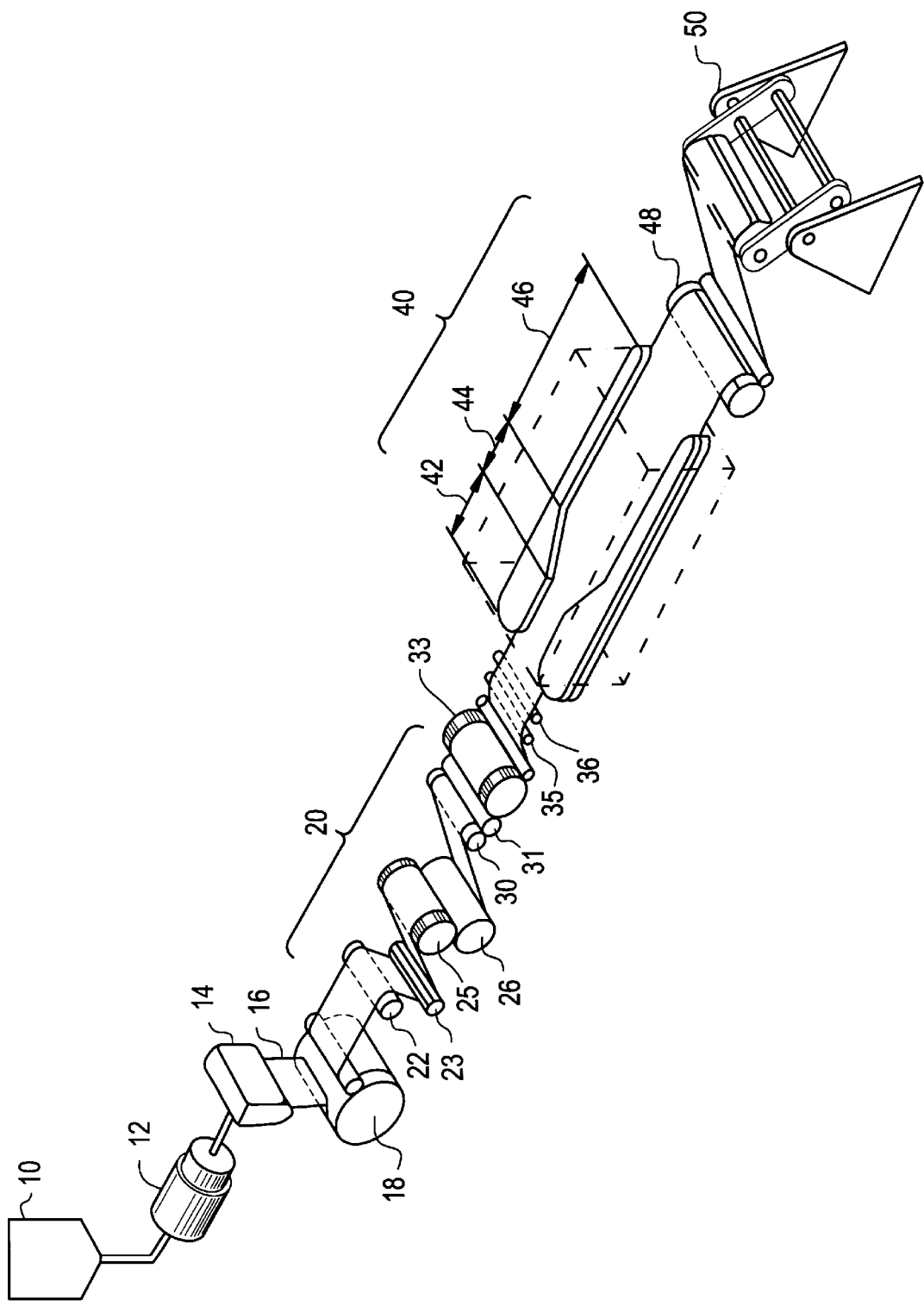
FIG. 1 is a diagram of reflecting an exemplary tenter-frame process for producing biaxially-oriented polypropylene films.

The present invention involves the use of a mini-random ethylene copolymer in amounts of no more than about 1 percent in combination with propylene in the making of various films with enhanced inter-layer bond strengths. While applicable in most propylene films where the basic physical and optical characteristics of a propylene homopolymer layer are needed, but an enhanced bonding strength is desired, the present description focuses on use in biaxially-oriented polypropylene films. Those with skill in the art will recognize the transferability of the same enhanced bonding strength provided by the teachings of the invention regardless of whether a film is oriented in one, two, or no directions.

Biaxially-oriented films are characterized in terms of certain well-defined characteristics relating to their stereo-regular structures and physical properties, including melt temperatures and shrinkage characteristics, as well as in relatively low coefficients of friction and relatively high tensile moduli and good barrier properties including relatively low permeation rates to oxygen and water. The biaxially-oriented films of the present invention are formed using a particularly configured polyolefin polymer as described in greater detail below and by using any suitable oriented film production technique, such as the conventionally-used tenter frame process.

The present invention addresses the use of a propylene-ethylene mini-random copolymer with an amount of ethylene no more than about 1 percent. The preferred method involves polymerization of the ethylene and propylene in the presence of an isospecific catalyst as known in the art. The resulting polymer incorporates the ethylene within the isotactic structure and pattern of the propylene. Alternative uses could incorporate the ethylene in an isotactic/syndiotactic polypropylene blend such as that disclosed in U.S. patent application Ser. No. 08/954,325, (entitled Improved Metal Bond Strength in Polypropylene Films, with the same inventive entity as the present application, filed contemporaneously with the present application, the entire disclosure of which is incorporated herein by reference), while maintaining many of the advantages of the proposed invention.

The polymerized mixture will often further include minor amounts (typically less than 1 weight percent, and more typically less than 0.5 weight percent) of additives designed to enhance other physical or optical properties. Such mixtures may have, for example, one or more anti-oxidants present in an amount totaling no more than about 0.25 weight percent (in the tested examples below no more than about 0.15 weight percent) and one or more acid neutralizers present in an amount totaling no more than about 0.25 weight percent (in the tested examples below no more than about 0.05 weight percent). Although not present in the tested examples, additives acting as "anti-block" agents may also be present, again in relatively low percentages such as no more than about 1 weight percent, more preferably no more than about 0.5 weight percent, and even no more than about 0.25 weight percent.

In general, biaxially-oriented film production can be of any suitable technique, such as disclosed in Canadian Patent Application No. 2,178,104 to Peiffer et al. As described in the Peiffer et al application, the entire disclosure of which is incorporated herein by reference, the polymer or polymers used to make the film are melted and then passed through an extruder to a slot die mechanism after which it is passed over a first roller, characterized as a chill roller, which tends to solidify the film. The film is then oriented by stressing it in a longitudinal direction, characterized as the machine direction, and in a transverse direction to arrive at a film which can be characterized in terms of orientation ratios, sometimes also referred to as stretch ratios, in both longitudinal and transverse directions. The machine direction orientation is accomplished through the use of two sequentially disposed rollers, the second or fast roller operating at a speed in relation to the slower roller corresponding to the desired orientation ratio. This may alternatively be accomplished through a series of rollers with increasing speeds, sometime with additional intermediate rollers for temperature control and other functions. After the film has been stressed in the machine direction, it is again cooled and then pre-heated and passed into a lateral stressing section, for example, a tenter frame mechanism, where it is again stressed, this time in the transverse direction. Orientation in the transverse direction is often followed by an annealing section. Subsequently, the film is then cooled and may be subjected to further treatment, such as a surface treatment (for example corona treatment or flame treatment), as described, for example, in the aforementioned Canadian Patent Application 2,178,104 or in U.S. Pat. No. 4,692,380 to Reid, the entire disclosure of which is incorporated here by reference. The film may also be metallized as described in the aforementioned U.S. Pat. No. 4,692,380 to Reid. While corona and flame treatment typically occurs immediately following orientation and prior to the initial roll up, metallizing is typically performed at a separate time and location.

Most sophisticated applications call for multi-layer oriented films. Many of these films use a core layer chosen for good stiffness and other physical properties (typically isotactic polypropylene homopolymer) with additional thinner exterior layers used for heat sealing, improved slip or barrier qualities, etc. Numerous methods exist for producing multi-layer films including coextrusion, extrusion coating, extrusion laminating, or standard lamination techniques.

Of particular interest with respect to the current invention is the use of multi-layer films with a heat-sealing layer contiguous with a propylene homopolymer core layer (or similarly performing core layer). Preferred values for the average thickness of the core layer are within the approximate range of 5 microns to 150 microns (the range of about 5 microns to 150 microns), with the preferred average thickness for the surface layer being within the approximate range of 0.3 microns to 80 microns (the range of about 0.3 microns to 80 microns). Regardless, the surface layer preferably has a thickness less than the core layer, preferably substantially less than the core layer.

The heat sealing generally occurs by placing the heat-sealing layer (typically a thermoplastic polymer, for example ethylene-propylene copolymer or ethylene-butene-propylene terpolymer) in contact with a corresponding layer (i.e., another thermoplastic polymer, for example ethylene-propylene copolymer or ethylene-butene-propylene terpolymer, preferably the corresponding layer will be have the same or similar chemical make-up as the heat-sealing layer) and using a combination of heat and pressure to create a seal bonding the two corresponding layers together. Obviously, in most instances, the heat-seal layer will be a surface layer in order to be able to contact and seal with another layer (or with a different section of itself). After sealing, it is possible that the sealed structure may constitute an internal layer in an even more complex multi-layer film or composition of multi-layer films.

The heat-seal strength is the strength required to separate the heat-sealed packaging. Typically the failure mode of such packaging is delamination of the heat-seal layer from the core layer. Hence, increasing the inter-layer bonding strength between the heat-seal layer and the core layer tends to improve the heat-seal strength of the multi-layer film. Also, for similar reasons, assuming a good heat seal has been made, the heat-seal strength will generally reflect the strength of the inter-layer bond between the core layer and the heat-seal layer.

The heat-sealing layers under discussion are most often coextruded with the core propylene homopolymer. Coextrusion involves coinjecting the polymer of the heat-seal layer and the polymer of the core layer through a slotted die system to form a film formed of an outer layer of the heat-sealing polymer and a core layer of the core polymer. Additional layers could also be coextruded, either being an additional heat-seal layer on the other surface of the core layer, or layers serving other functions, such as barriers, anti-block layers, etc. Alternatively, a heat-seal layer could be extrusion coated later in the film making process. Finally, other layers could be added to create a more complex film after or contemporaneous with the formation of the basic heat-seal layer to core layer relationship. In any event, the advantages of the present invention remain so long as the heat-seal layer is contiguous to and bonded with the core layer.

Turning now to FIG. 1, there is shown a schematic illustration of a suitable "Tenter Frame" orientation process which may be employed in producing biaxially-oriented polypropylene film ("BOPP film") in accordance with the present invention. More particularly and with reference to FIG. 1, a source of molten polymer is supplied from a hopper 10 to an extruder 12 and from there to a slot die 14 which produces a flat, relatively thick film 16 at its output. Film 16 is applied over a chill roller 18, and it is cooled to a suitable temperature within the range of about 30–60° C. The film is drawn off the chill roller 18 to a stretching section 20 to which the machine direction orientation occurs by means of idler rollers 22 and 23 which lead to preheat rollers 25 and 26.

As the film is drawn off the chill roller 18 and passed over the idler rollers, it is cooled to a temperature of about 30–60° C. In stretching the film in the machine direction, it is heated by preheat rollers 25 and 26 to an incremental temperature increase of about 60–100° C. and then passed to the slow roller 30 of the longitudinal orienting mechanism. The slow roller may be operated at any suitable speed, usually about 20–40 feet per minute in this type of pilot production line. The fast roller 31 is operated at a suitable speed, typically about 150 feet per minute in a pilot line, to provide a surface speed at the circumference of about 4–7 times that of the slow roller in order to orient the film in the machine direction. In a commercial production line, casting speeds may be much higher such as 20 to 60 meters per minute, with 120 to 360 meters per minute in final speeds.

As the oriented film is withdrawn from the fast roller, it is passed over a roller 33 at room temperature conditions. From here it is passed over tandem idler rollers 35 and 36 to a lateral stretching section 40 where the film is oriented by stretching in the transverse direction. The section 40 includes a preheat section 42 comprising a plurality of tandem heating rollers (not shown) where it is again reheated to a temperature within the range of 130–180° C. From the preheat section 42 of the tenter frame, the film is passed to a stretching or draw section 44 where it is progressively stretched by means of tenter clips (not shown) which grasp the opposed sides of the film and progressively stretch it laterally until it reaches its maximum lateral dimension. Lateral stretching ratios are typically greater than machine direction stretch ratios and often may range anywhere from 5–12 times the original width. Ratios of 8–10 times are usually preferred. The concluding portion of the lateral stretching phase includes an annealing section 46, such as an oven housing, where the film is heated at a temperature within the range of 130–170° C. for a suitable period in time, about 1–10 seconds. The annealing time helps control certain properties, and increased annealing is often specifically used to reduce shrinkage. The biaxially-oriented film is then withdrawn from the tenter frame and passed over a chill roller 48 where it is reduced to a temperature of less than about 50° C. and then applied to take-up spools on a take-up mechanism 50. From the foregoing description, it will be recognized that the initial orientation in the machine direction is carried out at a somewhat lower temperature than the orientation in the lateral dimension. For example, the film exiting the preheat rollers is stretched in the machine direction at a temperature of about 120° C. The film may be cooled to a temperature of about 50° C. and thereafter heated to a temperature of about 160° C. before it is subject to the progressive lateral dimension orientation in the tenter section.

Figure 2:
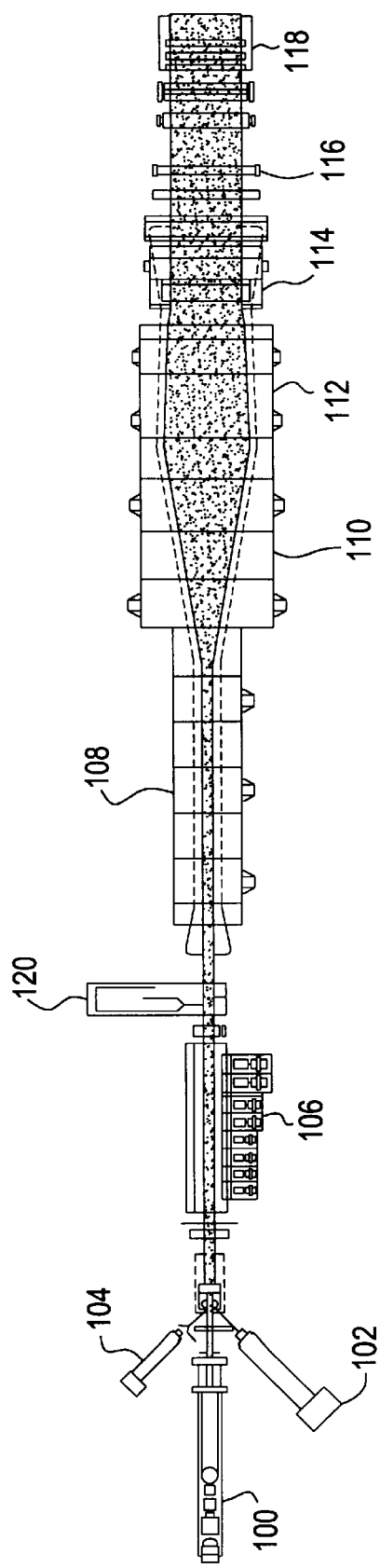
FIG. 2 is a diagram of a tenter-frame process including equipment for co-extrusion and/or extrusion coating of exterior layers around a core layer.

FIG. 2 is a schematic diagram illustrating a tenter-frame process including the capability of co-extruding one or two surface layers with the core layer. The main extruder 100 is flanked by two supplemental extruders 102 and 104. Through the operation of one of the supplemental extruders 102 or 104 a separate polymer or polymer blend may be extruded to be in contact with the primary polymer or polymer blend emerging from main extruder 100. If both supplemental extruders 102 and 104 are used, then a sandwich may be created with the primary polymer forming the core layer, and the polymers extruded by the supplemental extruders 102 and 104 forming surface layers. These surface layers may be identical or may be of different polymers or polymer blends, as the illustrated supplemental extruders 102 and 104 may pull from hoppers or sources of polymer separate from each other as well as being separate from the source for extruder 100. After extrusion and casting, the multi-layer film continues through the machine direction orientation section 106, pre-heating section 108, transverse direction orientation section 110, annealing section 112, cooling section 114, corona treating section 116, and finally the take-up (or wind-up) section 118. In an alternative method also available in FIG. 2, exterior layers may be added in the extrusion coating section 120, after machine direction orientation, but before transverse direction orientation. In extrusion coating section 120, additional material is extruded to coat either one or both surfaces of the mono-axially oriented film emerging from machine direction orientation section 106. The mono-axially oriented film to be extrusion coated may be a mono-layer film generated by primary extruder 100, or may be a multi-layer film created by co-extrusion by a combination of main extruder 100 and supplemental extruders 102 and 104.

The following examples illustrate the improved inter-layer bond strength provided by the present invention. These include unexpectedly significant advantages in inter-layer bond strength provided even with small amounts of ethylene. The improved inter-layer bond strength provides corresponding improvement in heat-seal strength of the multi-layer film.

EXAMPLE 1

Resins with and without a mini-random ethylene copolymer were processed through a biaxially-oriented polypropylene film making process using a tenter frame system and the resulting properties then measured.

The trial was conducted in a sixty inch continuous pilot tenter line. The films to be tested were manufactured by coextruding the mini-random ethylene copolymer (or the control isotactic polypropylene) with a layer of ethylene-propylene copolymer denominated Z9400-type containing approximately 6.1 percent by weight ethylene. The coextruded layer acts as a heat-seal layer. The line was capable of 76.2 meter per minute output and two sided corona discharge treatment. Biaxial orientation of flat films was carried out in two sequential steps. The casted sheet chilled on a rotating cold steel roll was first stretched longitudinally (in the machine direction or "MD") in the tangential gap between sets of rolls rotating at different speeds. Subsequently, the film was stretched transversely (in the transverse direction or "TD") in a tenter frame in which the edges of the film were gripped by a series of clips and diverged in TD. Standard MD draw ratio was 5 in one stage (5x:1x) and that in TD was consistently 9 (1x:9x). The films were surface treated by means of corona discharge treatment (corona treatment) with the level of treatment measured contemporaneously closely following the treatment. Temperature settings are listed in Table 1 below:

TABLE 1

| Temp | Melt | Cast Roll | Chill Roll | MDO | | | TDO | | |
|---|---|---|---|---|---|---|---|---|---|
| | | | | Cond | Stretch | Anneal | Cond | Stretch | Anneal |
| °C. | 221 | 43 | 49 | 116 | 121 | 127 | 166 | 160 | 154 |
| °F. | 430 | 110 | 120 | 240 | 250 | 260 | 330 | 320 | 310 |

This process was used to produce two multi-layer BOPP film samples. Sample CS-1 was a controlled sample containing isotactic polypropylene generated using standard Ziegler-Natta catalysis and further including the following additives: Irganox 1010 (an anti-oxidant) in an amount of 0.1 weight percent, Irgafos 168 (an anti-oxidant) in an amount of 0.05 weight percent, and calcium stearate (an acid neutralizer) in an amount of 0.05 weight percent. Sample RE-1 was configured identically with the sole exception that the polypropylene homopolymer was replaced by a propylene-ethylene copolymer containing approximately 0.6 percent by weight ethylene. These films were tested for inter-layer bond strength which results in improved heat-seal strength.

In order to test the heat-seal strength, the films were folded back on themselves so that the heat-seal layer was in contact with itself. The layer was basically welded to itself at one of two temperatures creating a heat seal. When such a sample is pulled apart in an Instron, the normal seal failure mode is delamination of the homopolymer layer (or mini-random copolymer layer) from the heat-seal layer, as this tends to be the weakest bond. Even if failure occurs in another mode, it still defines a minimum strength for the inter-layer bond between the homopolymer layer and the heat-sealing layer.

Table 2, following, details the results of the tests providing Bond Strengths in N/m for the two samples at the two different seal temperatures:

TABLE 2

| Seal Temperature/Sample | CS-1 | RE-1 |
|---|---|---|
| Seal Temp. 110° C. | 39 N/m | 41 N/m |
| Seal Temp. 127° C. | 151 N/m | 255 N/m |

At a sealing temperature of 110° C. a good bond/heat seal was not obtained, thus leaving the bond as the probable failure mechanism with equivalent strengths for both samples. Once a good bond/heat seal was obtained the improved strength of the inter-layer bond was reflected in the heat-seal strength. The mini-random ethylene copolymer provided an approximately 70 percent improvement in the inter-layer bond strength between the core layer and the heat-seal layer as compared with an equivalent heat-seal layer bonded with polypropylene homopolymer. Improvement of at least 50 percent is expected in most instances.

EXAMPLE 2

In another experiment, a mini-random ethylene copolymer containing approximately 0.1 to 0.2 percent weight ethylene and possibly as low as 0.05 weight percent was run in the middle of a batch of propylene homopolymer being used to form biaxially-oriented polypropylene films with a heat-seal layer. The tests on the heat-seal strength of the films produced demonstrated an approximately 20 percent increase on average over the seal strength of the same films using propylene homopolymer. The individual strength improvement ranged from about 15 percent to about 25 percent or more.

In summary, the use in a core layer of an ethylene-propylene copolymer containing ethylene in an amount no more than about 1.0 weight percent, preferably between about 0.05 and about 0.8 weight percent, more preferably between about 0.1 and about 0.7 weight percent, and most preferably between about 0.3 and 0.5 weight percent, is believed to provide enhancement of inter-layer bond strength of at least about 15 percent over the strength of the bond between the heat-seal layer and a film formed of polypropylene homopolymer. For ethylene contents between about 0.5 and about 0.7 weight percent, and preferably about 0.6 weight percent these advantages are anticipated to be at least about 50 percent, and potentially to average at least about 60 percent. Even surprisingly low levels of ethylene content, between about 0.05–0.4 weight percent, more specifically about 0.1–0.2 weight percent, would give enhancements in inter-layer bond strength that may be at least about 15 percent, and potentially at least about 30 percent over the bond strength using a film formed of polypropylene homopolymer. As noted above, the most preferred ethylene content of about 0.3–0.5 weight percent will provide enhanced inter-layer bond strengths with heat-seal layers of at least about 30 percent, and potentially at least about 50 percent, over the bond strength of the same or similar heat-seal layers bonded with a film formed of isotactic polypropylene homopolymer.

Having described specific embodiments of the present invention, it will be understood that modifications thereof may be suggested to those skilled in the art, and it is intended to cover all such modifications as fall within the scope of the appended claims.

What is claimed:

1. In the production of a multi-layer film of enhanced interlayer bond strength between a core layer and at least one surface layer, the process comprising
   a. providing a first polymer to form a surface layer of said film comprising a thermoplastic polymer capable of forming an effective heat seal with a corresponding thermoplastic film upon heating to an elevated temperature and compression;

b. providing a second polymer to form a core layer of said film of an ethylene-polypropylene random copolymer having an isotactic structure and comprising an ethylene content of no more than one weight per cent which is effective to provide an interlayer bond strength between said core layer and said surface layer which is about 15 percent greater than the interlayer bond strength between said surface layer and a film formed of isotactic polypropylene homopolymer; and c. forming said first and second polymers into a surface layer and a core layer respectively to provide a multi-layer film of enhanced interlayer bond strength in which said surface layer is contiguous to and bonded with said core layer.

2. The process of claim 1 wherein said surface layer has a thickness which is less than the thickness of said core layer.

3. In a process for producing a multi-layer film of enhanced inter-layer bond strength, the combination comprising:

a. providing a first polymer of said film comprising a thermoplastic polymer capable of forming an effective heat seal with a corresponding thermoplastic film upon heating to an elevated temperature and compression;

b. providing a second polymer formed of ethylene-propylene random copolymer having an isotactic structure; and, c. coinjecting said first and second polymers through a slotted die system to form a film formed of a surface layer of said first polymer and a core layer of said second polymer, wherein said second polymer contains ethylene in an amount of no more than about one weight percent which is effective to provide an inter-layer bond strength between said core layer and said surface layer which is at least about 15 percent greater than the inter-layer bond strength between said surface layer and a film formed of isotactic polypropylene homopolymer.

4. The process of claim 3, wherein said inter-layer bond strength between said surface layer and said core layer is at least about 50 percent greater than the inter-layer bond strength between said surface layer and a film formed of isotactic polypropylene homopolymer.

5. The process of claim 4, wherein said core layer formed of ethylene-propylene copolymer contains ethylene in an amount between about 0.5 weight percent and about 0.6 weight percent.

6. The process of claim 3, wherein said core layer formed of ethylene-propylene copolymer contains ethylene in an amount between about 0.05 weight percent and about 0.8 weight percent.

7. The process of claim 3, wherein said second polymer contains ethylene in an amount between about 0.3 weight percent and about 0.5 weight percent and wherein said inter-layer bond strength between said surface layer and said core layer is at least about 30 percent greater than the inter-layer bond strength between said surface layer and a film formed of isotactic polypropylene homopolymer.

8. The process of claim 3, wherein said core layer formed of ethylene-propylene copolymer contains ethylene in an amount between about 0.1 weight percent and about 0.2 weight percent.

9. The process of claim 3, further comprising the step of stretching said film in at least one direction to form an oriented film after said coinjecting step.

10. The process of claim 9, wherein said step of stretching said film in at least one direction comprises stretching said film in the machine direction further comprising the additional step after stretching said film in the machine direction of stretching said film in the transverse direction while heating said film above 120° C., producing a biaxially-oriented multi-layer polyolefin film.

11. The process of claim 3, further comprising the step of providing a third polymer of said film which is co-injected with said first and second polymers to form another layer of said film.

12. The process of claim 11, wherein said coinjecting step further comprises coinjecting said third polymer with said first and second polymers through a slotted die system to form a film formed of a first surface layer formed of said first polymer, a core layer formed of said second polymer contiguous to said first surface layer, and a second surface layer formed of said third polymer contiguous to said core layer and not contiguous to said first surface layer.

13. The process of claim 12, wherein said third polymer is a thermoplastic polymer capable of forming an effective heat seal with a corresponding thermoplastic film upon heating to an elevated temperature and compression.

14. The process of claim 12, wherein said second surface layer and said first surface layer are formed of the same material, wherein said second surface layer is capable of forming an effective heat seal with said first surface layer upon heating to an elevated temperature and compression.

15. The process of claim 3 wherein said first and second polymers are coinjected through said slotted die system to form said surface layer of said first polymer which has a thickness less than the core layer formed of said second polymer.

16. In a process for producing a multi-layer film of enhanced inter-layer bond strength, the combination comprising:

a. providing a first polymer of said film comprising a thermoplastic polymer capable of forming an effective heat seal with a corresponding thermoplastic film upon heating to an elevated temperature and compression;

b. providing a second polymer formed of ethylene-propylene random copolymer having an isotactic structure; and, c. injecting said second polymer through a slotted die system to form a film;

d. stretching said film in at least one direction to form an oriented film; and e. extrusion coating at least one side of said film with said first polymer, forming a surface layer of said first polymer and a core layer of said second polymer, wherein said second polymer contains ethylene in an amount of no more than about one weight percent which is effective to provide an inter-layer bond strength between said core layer and said surface layer which is at least about 15 percent greater than the inter-layer bond strength between said surface layer and a film formed of isotactic polypropylene homopolymer.

17. The process of claim 16, further comprising the additional step after said extrusion coating step of stretching said film in the transverse direction while heating said film above 120° C., producing a biaxially-oriented multi-layer polyolefin film.

* * * * *